US011840162B2

(12) United States Patent
Beauquet et al.

(10) Patent No.: US 11,840,162 B2
(45) Date of Patent: Dec. 12, 2023

(54) VEHICLE SEAT SLIDE ATTACHMENT

(71) Applicant: FAURECIA Sièges d'Automobile, Nanterre (FR)

(72) Inventors: Pierre-François Beauquet, Caen (FR); Guillaume Gabillard, Cormelles-le-Royal (FR); Christian Couasnon, Flers (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 381 days.

(21) Appl. No.: 17/159,641

(22) Filed: Jan. 27, 2021

(65) Prior Publication Data

US 2021/0229574 A1    Jul. 29, 2021

(30) Foreign Application Priority Data

Jan. 29, 2020   (FR) ........................................ 2000885

(51) Int. Cl.
*B60N 2/06* (2006.01)
*B60N 2/02* (2006.01)

(52) U.S. Cl.
CPC ......... *B60N 2/067* (2013.01); *B60N 2/02246* (2023.08); *B60N 2/0244* (2013.01); *B60N 2/02253* (2023.08)

(58) Field of Classification Search
CPC .... B60N 2/067; B60N 2/0232; B60N 2/0715; B60N 2/075
USPC ................................. 296/65.15, 65.13, 65.01
See application file for complete search history.

(56) References Cited

U.S. PATENT DOCUMENTS

| 8,191,850 | B2 | 6/2012 | Wetzig |
| 8,469,432 | B2 | 6/2013 | Couasnon |
| 8,540,203 | B2 * | 9/2013 | Ruess ................... B60N 2/067 |
| | | | 296/65.13 |
| 9,242,579 | B2 * | 1/2016 | Speck ................. B60N 2/0722 |

(Continued)

FOREIGN PATENT DOCUMENTS

| CN | 201423941 Y | 3/2010 |
| DE | 102009058450 B3 | 5/2011 |

(Continued)

OTHER PUBLICATIONS

French Preliminary Search report for FR2000885 dated Nov. 10, 2020, BET200403 FR, 8 pages, (No English Translation Available).

*Primary Examiner* — Jason S Morrow
*Assistant Examiner* — Wenwei Zhuo
(74) *Attorney, Agent, or Firm* — BARNES & THORNBURG LLP

(57) ABSTRACT

The present disclosure relates to a slide comprising a fixed profile and a movable profile mounted on the fixed profile so as to slide in a longitudinal direction, the slide comprising a longitudinal adjustment screw, the fixed profile presenting a bottom having an outer face opposite the adjustment screw, the adjustment screw having one end integral with a support which comprises two longitudinal side walls able to receive the end. The bottom comprises two longitudinal parallel slots, and the bottom and the support each have a hole which are in line with one another and are able to receive an attachment part for attaching the fixed profile to the floor of a vehicle when the side walls are engaged in the slots with the rest of the support facing the outer face.

5 Claims, 4 Drawing Sheets

(56) References Cited

U.S. PATENT DOCUMENTS

| | | | | |
|---|---|---|---|---|
| 2011/0278875 A1* | 11/2011 | Couasnon | ............... | B60N 2/067 296/65.13 |
| 2013/0087674 A1* | 4/2013 | Couasnon | ............... | B60N 2/002 248/429 |
| 2014/0123783 A1* | 5/2014 | Geiges | .................... | B60N 2/067 74/25 |
| 2016/0075259 A1* | 3/2016 | Couasnon | ............ | B60N 2/0705 297/344.1 |
| 2018/0043797 A1* | 2/2018 | Hoffmann | ............ | B60N 2/0705 |
| 2019/0016236 A1* | 1/2019 | Couasnon | ............. | B60N 2/0725 |
| 2020/0171981 A1* | 6/2020 | Imamura | ................ | B60N 2/067 |

FOREIGN PATENT DOCUMENTS

| | | |
|---|---|---|
| DE | 102010010585 B4 | 3/2013 |
| EP | 3271209 B1 | 1/2018 |
| FR | 2959969 A1 | 11/2011 |
| FR | 3025756 A1 | 3/2016 |
| FR | 3068928 A1 | 1/2019 |

\* cited by examiner

VEHICLE SEAT SLIDE ATTACHMENT

PRIORITY CLAIM

This application claims priority to French Patent Application No. FR2000885, filed Jan. 29, 2020, which is expressly incorporated by reference herein.

BACKGROUND

The present disclosure relates to a slide for a vehicle seat, and to a vehicle seat comprising such a slide.

SUMMARY

The present disclosure aims to provide a slide in which the end of the adjustment screw is integrally and reliably secured to the fixed profile, and in which the slide is effectively attached to the floor, the structure of the slide being as simple as possible, and the slide having good impact resistance.

This goal is achieved due to the fact that the bottom comprises two parallel slots, the fact that the body of the support is located facing the outer face and the side walls are each engaged in one of the slots, and the fact that the bottom has a first hole and the body has a second hole which is in line with the first hole when the side walls are engaged in the slots, the first hole and the second hole being able to receive an attachment part for attaching the fixed profile on the floor of the vehicle.

With these arrangements, the attachment of the slide to the floor is achieved in a simple and efficient manner, and the slide has good impact resistance since the side walls help to keep the support in contact with the slide. In addition, the structure of the slide is simpler because the support acts to maintain space between the slide and the floor, which eliminates the need to use an additional part for this purpose.

In illustrative embodiments, the bottom comprises a first member and the body comprises a second member, and the first member and second member cooperate with each other to help integrally secure the support to the bottom.

In illustrative embodiments, the integral securing of the support to the fixed profile is thus reinforced.

In illustrative embodiments, the first member is a third hole and the second member is a protrusion, the protrusion being inserted into the third hole and then deformed to prevent withdrawal of the protrusion from the third hole.

The present disclosure also relates to a seat comprising two parallel slides.

The present disclosure also relates to an assembly consisting of a seat according to the present disclosure, a floor, and a plurality of attachment parts for attaching the slides of the seat to the floor of the vehicle.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
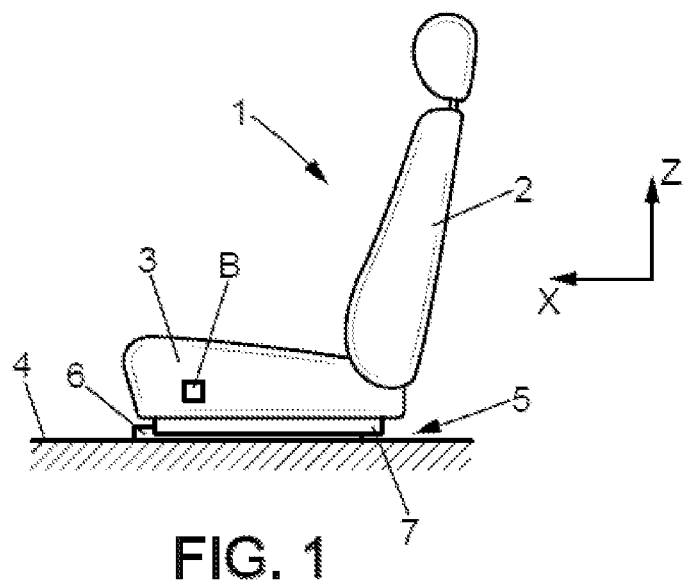
FIG. 1 is a schematic side view of a seat including slides according to the present disclosure.

FIG. 1 shows a motor vehicle seat 1 which comprises a seating portion 3 and a backrest 2 carried by this seating portion 3. The seating portion 3 is mounted on the floor 4 of the vehicle so as to slide in a substantially horizontal longitudinal direction X by means of two parallel slides 5, of which only one is visible in FIG. 1. In the longitudinal direction X, the "front-rear" direction is defined relative to the seating portion 3, the rear of the seating portion 3 being its connection with the backrest 2.

Figure 2:
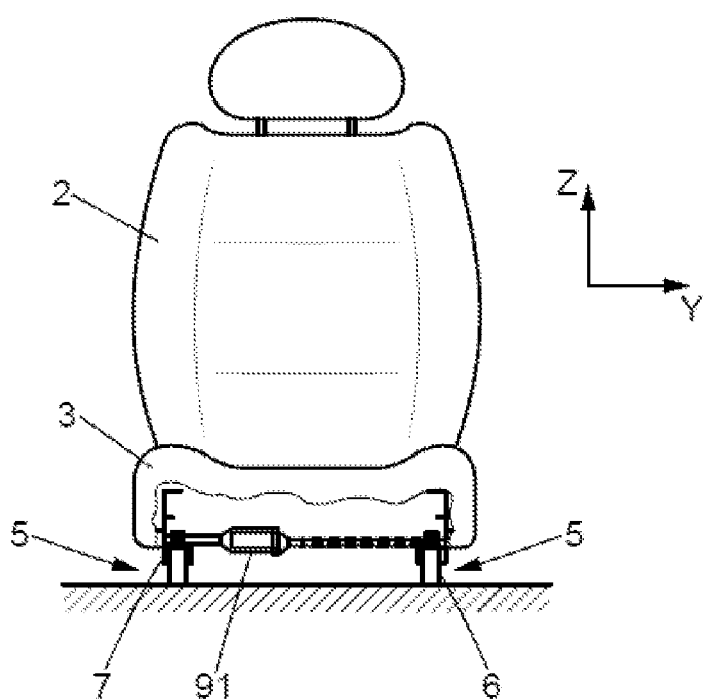
FIG. 2 is a schematic front view of a seat including slides according to the present disclosure.

As shown in FIG. 2, each of the slides 5 comprises a fixed metal profile 6 connected to the floor 4 and a movable metal profile 7 connected to the seating portion 3, which slide on each other in the X direction. The transverse direction Y is the direction perpendicular to these two slides 5 in the plane of these slides 5. The vertical direction Z is perpendicular to the (X, Y) plane. In the vertical direction Z, the direction "below/lower-above/upper" is defined relative to the backrest 2, the lower part of the backrest 2 being its connection with the seating portion 3, the upper part of the backrest 2 being its top.

Figure 3:
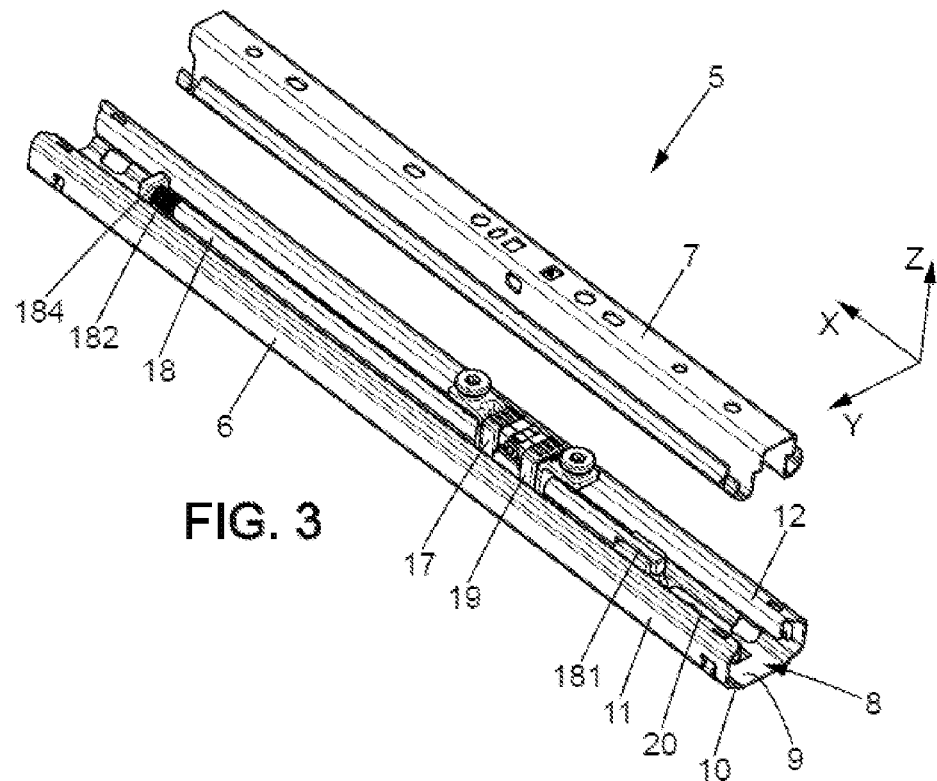
FIG. 3 is an exploded perspective view of one of the slides of the seat of FIGS. 1 and 2.

FIG. 3 is a perspective view of a slide 5 with the movable profile 7 shown offset from the fixed profile 6. The fixed profile 6 has, for example, as shown in FIG. 3, a substantially U-shaped cross-section. The fixed profile 6 thus comprises on the one hand a horizontal bottom 8 which extends lengthwise in the X direction and widthwise in the transverse horizontal direction Y, the bottom 8 having an inner face 9 (meaning an upper face oriented towards the interior of the slide 5) and an outer face 10 opposite the inner face 9, and on the other hand two side wings 11, 12 which extend one on each side of the bottom 8, lengthwise in the X direction and heightwise in the vertical direction Z. The bottom 8 of the fixed profile 6 is fixed to the floor 4 of the vehicle by any suitable means.

Advantageously, the sliding of the movable profile 7 relative to the fixed profile 6 is carried out automatically. For example, a slide 5 comprises a motorized adjustment device 17 which comprises: an adjustment screw 18 integral with the bottom 8 of the fixed profile 6; and a device 19 with a rotating nut in which the rotating nut (not shown) is screwed onto the screw 18 and is mounted to rotate about the X direction within a housing (not shown) that is integral with the movable profile 7. The rotating nut of the device 19 is rotated by an electric motor 91 which in general is shared by the two slides 5 of the seat 1. This motor 91 is controlled by a button B (visible in FIG. 1), which is arranged for example on the side of the seating portion 3 of the seat. The motor 91 is visible in FIG. 2.

The adjustment screw 18 has a front end 182 which is attached to the bottom 8 of the fixed profile by any known means, for example by an attachment bracket 184 attached to the bottom 8.

The adjustment screw 18 has a rear end 181 opposite the front end 182, is connected to the bottom 8 of the fixed profile 6 by means of a metal support 20 which will be described in more detail with reference to FIGS. 4 to 7.

The rear end 181 of the adjustment screw 18 is engaged between the side walls 24 of the support 20. For example, in a manner that is known per se, the rear end 181 may comprise two parallel and opposite flat areas 1814 which each rest against the inner face of one of the side walls 24, such that the rear end 181 of the adjustment screw 18 is nested and rotationally immobilized between the side walls 24. The flat areas 1814 are visible in FIG. 7. The rear end 181 may further be welded to the side walls 24, or be attached to the side walls 24 by any other suitable means.

The support 20 comprises a body 21 which is extended in the longitudinal direction X by a web 25 which carries two side walls 24. The two side walls 24 extend in parallel in the plane (X, Z) between the side wings 11, 12 of the fixed profile 6, and are interconnected by the web 25. The web 25 is parallel to the bottom 8 and extends substantially in plane (X, Y) between the lower ends of the side walls 24.

With the support 20 in the position where it is integrally secured to the fixed profile 6, the body 21 and the web 25 of the support 20 are located facing the outer face 10, for example against it, and the side walls 24 are each engaged in one of the slots 84. In addition, the rear end 181 of the adjustment screw 18 is engaged between the side walls 24 of the support 20. This assembly of the support 20 with the fixed profile 6 is easier to achieve than when the body 21 is housed inside the fixed profile 6 (meaning within the volume of the U of this profile).

The bottom 8 has a first hole 811, and the body 21 has a second hole 211 which is in line with the first hole 811 when the side walls 24 are engaged in the slots 84. Thus, the first hole 811 and second hole 211 are able to receive an attachment part 95 for attaching the fixed profile 6 to the floor 4 of the vehicle. This attachment part 95 contributes to integrally securing the support 20 to the fixed profile 6. This attachment of the fixed profile 6 to the floor 4 by the attachment part 95 is described below with reference to FIG. 8.

Advantageously, as shown in FIGS. 4 to 7, the bottom 8 comprises a first member 82 and the body 21 comprises a second member 22, the first member 82 and second member 22 cooperating with each other to help integrally secure the support 20 to the bottom 8. This cooperation occurs when the support 20 is in the position where it is integrally secured to the profile 6, as described above.

For example, the first member 82 is a third hole and the second member 22 is a protrusion, the protrusion being inserted into the third hole and then deformed to prevent withdrawal of the protrusion from the third hole. This deformation may be cold or hot.

Figure 4:
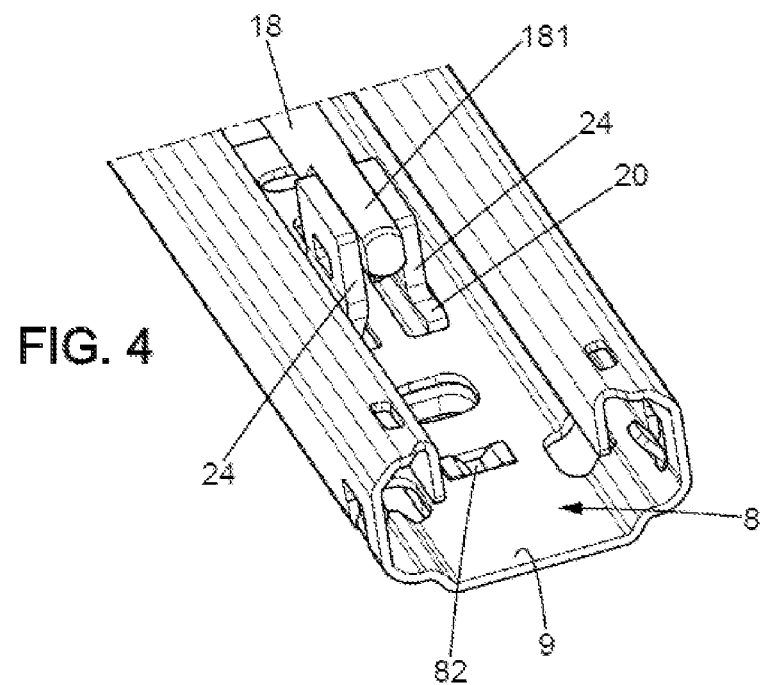
FIG. 4 is a perspective top view of one end of the slide of FIG. 3, showing the support.

FIG. 4 illustrates the end of a slide 5 in a perspective top view when the support 20 is in the position where it is integrally secured to the fixed profile 6. The movable profile 7 has been removed to show the position of the rear end 181 of the adjustment screw 18 between the side walls 24 of the support 20.

Figure 5:
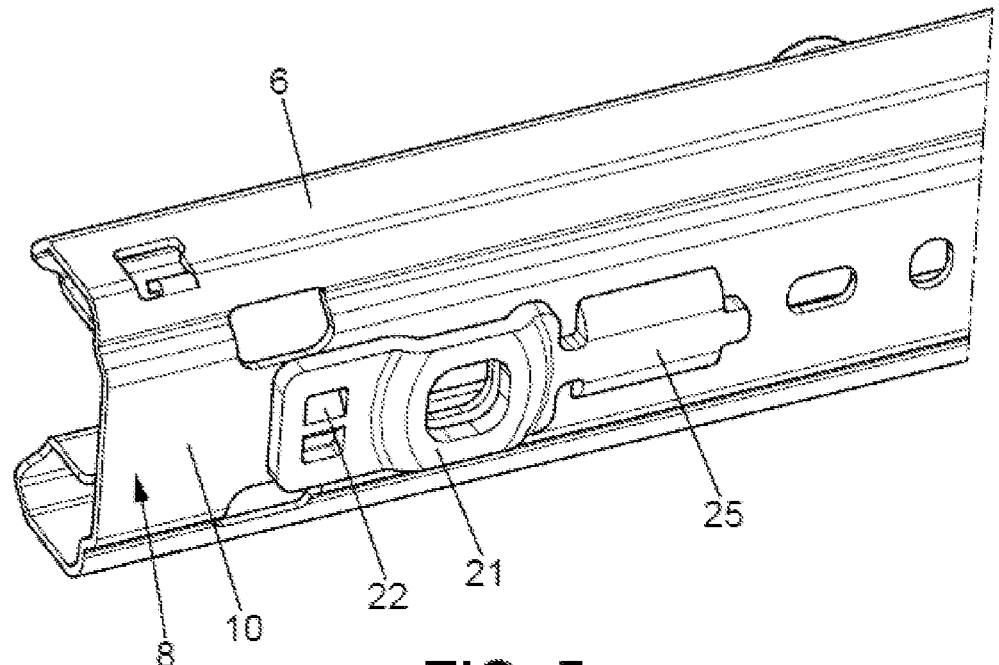
FIG. 5 is a perspective bottom view of one end of the slide of FIG. 3, showing the support.

FIG. 5 illustrates the same slide 5 as the one in FIG. 4, in a perspective bottom view. The body 21 and the web 25 of the support 20 bear against the outer face 10 of the bottom 8. The protuberance (second member 22) of the support 20 is housed in the third hole (first member 82) of the bottom 8.

Figure 6:
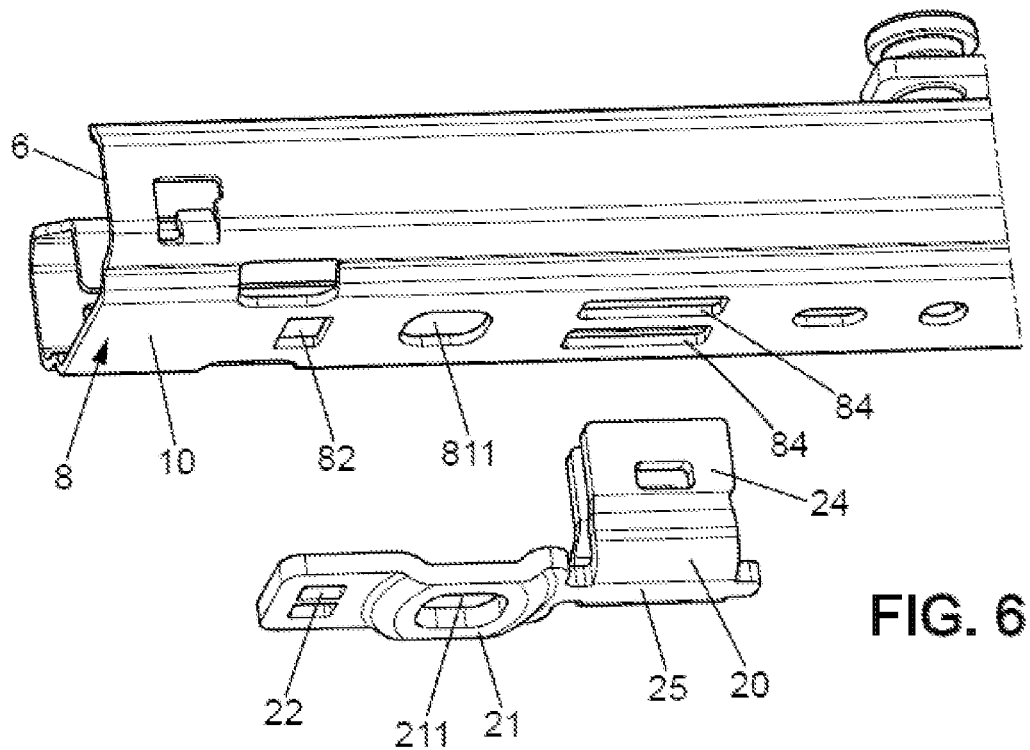
FIG. 6 is an exploded perspective view of the end of the slide of FIG. 3.

FIG. 6 illustrates the same slide as the one in FIG. 5, in a perspective bottom view, before the support 20 is made integral with the profile 6.

Figure 7:
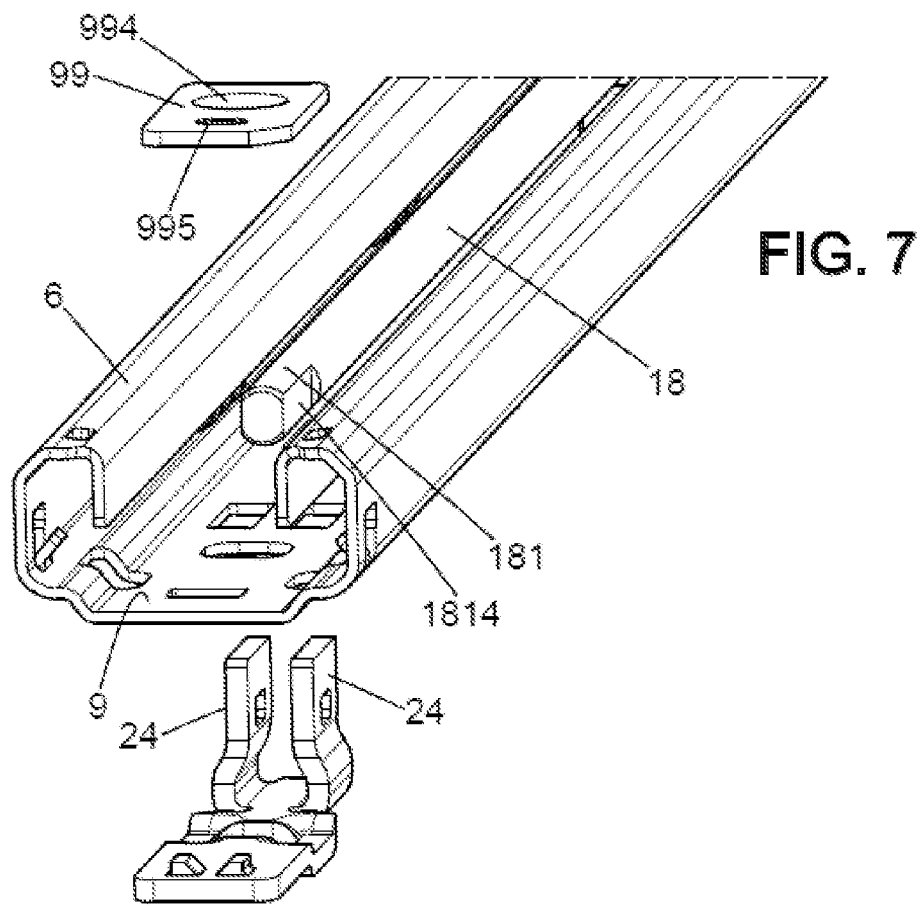
FIG. 7 is an exploded perspective view of the end of another embodiment of a slide according to the present disclosure.

FIG. 7 illustrates another embodiment of the present disclosure, in which the support 20 is made integral with the profile 6 using a plate 99. The plate 99 has a fourth hole 994 and a fifth hole 995. In the position where the support 20 is integrally secured to the fixed profile 6, the fourth hole 994 is in line with the first hole 811 of the bottom 8, allowing the passage of the attachment part 95 for attaching the fixed profile 6 to the floor 4 of the vehicle. In addition, the fifth hole 995 is in line with the third hole (first member 82) in order to allow the engagement of the protuberance (second member 22) of the support 20 with this fifth hole 995.

Figure 8:
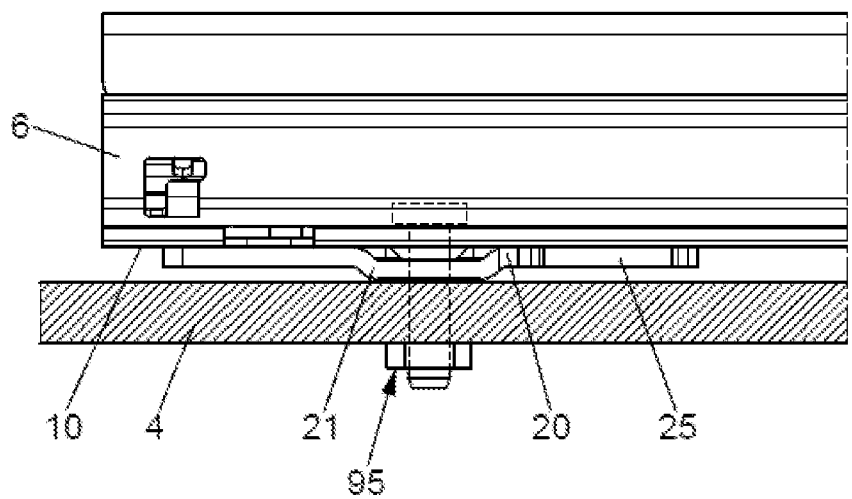
FIG. 8 is a side view of a slide according to the present disclosure, fixed to the floor of the vehicle.

FIG. 8 illustrates the mechanical attachment of the fixed profile 6 (and therefore of the slide 5) to the floor 4 of the vehicle using an attachment part 95. For example this attachment part 95 is a bolt and a nut. One will note that the body 21 and the web 25 of the support 20, by their positioning near the outer face 10 of the bottom 8, acts to maintain space between the slide 5 and the floor 4, which eliminates the need to use an additional part for this purpose. Advantageously the body 21 is curved, being convex relative to the outer face 10, which increases this maintained space.

The present disclosure also relates to a seat 1 comprising two parallel slides 5 as described above.

The present disclosure also relates to an assembly consisting of a seat 1 according to the present disclosure, a floor 4, and a plurality of attachment parts 95 for attaching the slides 5 of the seat 1 to the floor 4 of the vehicle.

The present disclosure also relates to an assembly comprising a seat 1 according to the present disclosure, a floor 4, and a plurality of attachment parts 95 for attaching the slides 5 of the seat 1 to the floor 4 of the vehicle.

The present disclosure relates to a slide for a vehicle seat, and to a vehicle seat comprising such a slide.

More particularly, the present disclosure relates to a slide for a vehicle seat comprising a fixed profile suitable for being integrally secured to a floor of the vehicle and a movable profile mounted on the fixed profile so as to slide in a longitudinal direction X and intended to carry the seating portion of the seat, the slide comprising a control mechanism comprising an adjustment screw which extends along the longitudinal direction X, the fixed profile having a bottom which extends widthwise in a transverse direction Y between two side wings of the fixed profile, the bottom having an inner face oriented towards the adjustment screw and an outer face opposite the adjustment screw, the adjustment screw being integral at one of its ends with a support which comprises a body and two side walls extending in parallel in the longitudinal direction X between the side wings, the end being able to be fixed between the side walls.

Such a slide further comprises a device for attaching the fixed profile to the floor of the vehicle. There may be a desire to simplify the manufacture of the slide.

The present disclosure aims to remedy these disadvantages.

The present disclosure relates to a slide 5 comprising a fixed profile 6 and a movable profile 7 mounted on the fixed profile 6 so as to slide in a longitudinal direction X, the slide 5 comprising a longitudinal adjustment screw 18, the fixed profile 6 presenting a bottom 8 having an outer face 10 opposite the adjustment screw 18, the adjustment screw 18 having one end 181 integral with a support 20 which comprises two longitudinal side walls able to receive the end 181. The bottom 8 comprises two longitudinal parallel slots, and the bottom 8 and the support 20 each have a hole which are in line with one another and are able to receive an attachment part for attaching the fixed profile 6 to the floor of a vehicle when the side walls are engaged in the slots with the rest of the support 20 facing the outer face 10.

The following numbered clauses include embodiments that are contemplated and non-limiting:

Clause 1. A slide (5) for a vehicle seat (1), comprising a fixed profile (6) suitable for being integrally secured to a floor (4) of the vehicle and a movable profile (7) mounted on the fixed profile (6) so as to slide in a longitudinal direction (X) and intended to carry the seating portion of the seat, the slide (5) comprising a control mechanism comprising an adjustment screw (18) which extends along the longitudinal direction (X), the fixed profile (6) having a bottom (8) which extends widthwise in a transverse direction (Y) between two side wings (11, 12) of the fixed profile (6), the bottom (8) having an inner face (9) oriented towards the adjustment screw (18) and an outer face (10) opposite the adjustment screw (18), the adjustment screw (18) being integral at one of its ends (181) with a support (20) which comprises a body (21) and two side walls (24) extending in parallel in the longitudinal direction (X) between the side wings (11, 12), the end (181) being able to be fixed between the side walls (24), the slide (5) being characterized in that the bottom (8) comprises two parallel slots (84), in that the body (21) of the support (20) is located facing the outer face (10) and the side walls (24) are each engaged in one of the slots (84), in that the bottom has a first hole (811), and in that the body (21) has a second hole (211) which is in line with the first hole (811) when the side walls (24) are engaged in the slots (84), the first hole (811) and the second hole (211) being able to receive an attachment part for attaching the fixed profile (6) to the floor (4) of the vehicle.

Clause 2. The slide (5) according to clause 1, wherein the bottom (8) comprises a first member (82) and the body (21) comprises a second member (22), and wherein the first member (82) and the second member (22) cooperate with each other to help integrally secure the support (20) to the bottom (8).

Clause 3. The slide (5) according to clause 2, wherein the first member (82) is a third hole and the second member (22) is a protrusion, the protrusion being inserted into the third hole and then deformed to prevent withdrawal of the protrusion from the third hole.

Clause 4. A seat (1) comprising two parallel slides (5) according to any one of the preceding clauses.

Clause 5. An assembly consisting of a seat (1) according to the preceding clause, a floor (4), and a plurality of attachment parts (95) for attaching the slides (5) of the seat (1) to the floor (4) of the vehicle.

Clause 6. An assembly comprising a seat (1) according to the preceding clause, a floor (4), and a plurality of attachment parts (95) for attaching the slides (5) of the seat (1) to the floor (4) of the vehicle.

The invention claimed is:

1. A slide for a vehicle seat, the slide comprising
a fixed profile adapted to be integrally secured to a floor of a vehicle and
a movable profile mounted on the fixed profile so as to slide in a longitudinal direction and adapted to carry a seating portion of the vehicle seat,
a control mechanism comprising an adjustment screw which extends along the longitudinal direction, the fixed profile having a bottom which extends widthwise in a transverse direction between two side wings of the fixed profile, the bottom having an inner face oriented towards the adjustment screw and an outer face opposite the adjustment screw, the adjustment screw being integral at one of its ends with a support which comprises a body and two side walls extending in parallel in the longitudinal direction between the side wings, the end being able to be fixed between the side walls,
wherein the bottom comprises two parallel slots, in that the body of the support is located facing the outer face and the side walls are each engaged in one of the slots, in that the bottom has a first hole, and in that the body has a second hole which is in line with the first hole when the side walls are engaged in the slots, the first hole and the second hole being able to receive an attachment part for attaching the fixed profile to the floor of the vehicle.

2. The slide of claim 1, wherein the bottom comprises a first member and the body comprises a second member, and wherein the first member and the second member cooperate with each other to help integrally secure the support to the bottom.

3. The slide of claim 2, wherein the first member is a third hole and the second member is a protrusion, the protrusion being inserted into the third hole and then deformed to block withdrawal of the protrusion from the third hole.

4. A seat comprising two parallel slides according to claim 1.

5. An assembly comprising the seat of claim 4, a floor, and a plurality of attachment parts for attaching the slides of the seat to the floor of the vehicle.

* * * * *